(12) United States Patent  
Kajaria et al.

(10) Patent No.: US 10,174,584 B2  
(45) Date of Patent: Jan. 8, 2019

(54) SAFETY SYSTEMS FOR ISOLATING OVERPRESSURE DURING PRESSURIZED FLUID OPERATIONS

(71) Applicant: GE Oil & Gas Pressure Control LP, Houston, TX (US)

(72) Inventors: Saurabh Kajaria, Houston, TX (US); Robert Ripple, Richmond, TX (US); Travis Kyle McEvoy, Houston, TX (US); Keith M. Adams, Katy, TX (US); Gerald Schofield, Katy, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 466 days.

(21) Appl. No.: 14/683,653

(22) Filed: Apr. 10, 2015

(65) Prior Publication Data

US 2015/0292297 A1    Oct. 15, 2015

Related U.S. Application Data

(60) Provisional application No. 61/978,611, filed on Apr. 11, 2014, provisional application No. 62/092,583, filed on Dec. 16, 2014.

(51) Int. Cl.
*G05D 7/06* (2006.01)  
*E21B 34/02* (2006.01)  
(Continued)

(52) U.S. Cl.
CPC ............ *E21B 34/02* (2013.01); *E21B 33/068* (2013.01); *E21B 34/00* (2013.01); *E21B 43/26* (2013.01);
(Continued)

(58) Field of Classification Search
CPC .. G05D 7/0635; G05D 7/0623; G05D 7/0629; Y10T 137/777; Y10T 137/7769;
(Continued)

(56) References Cited

U.S. PATENT DOCUMENTS 2,825,528 A    3/1958  Truitt  
4,186,766 A *  2/1980  Snyder .................. F16K 17/105  
                                              137/458

(Continued)

FOREIGN PATENT DOCUMENTS

EP         20060116304 A2    7/2007

OTHER PUBLICATIONS

PCT Search Report and Written Opinion issued in connection with corresponding PCT Application No. PCT/US2015/025541 dated Jul. 21, 2015.

(Continued)

*Primary Examiner* — George S Gray  
(74) *Attorney, Agent, or Firm* — Hogan Lovells US LLP

(57) ABSTRACT

An overpressure safety system for use with a distribution of pressurized fluid associated with hydrocarbon production operations includes a safety valve in fluid communication with a main bore of a fluid control manifold assembly. The safety valve has a blocking condition where the safety valve blocks a flow of pressurized fluid through the safety valve, and a venting condition where the safety valve provides a fluid flow path for the pressurized fluid at a set overpressure to pass through the safety valve. A valve member is moveable within the safety valve between a first position where a pressure side of the valve member blocks the flow of the pressurized fluid at a pressure below the set overpressure from passing through the safety valve, and a second position (Continued)

where the valve member provides a fluid flow path for the pressurized fluid at any pressure to pass through the safety valve.

16 Claims, 6 Drawing Sheets

(51) Int. Cl.
| | |
|---|---|
| *E21B 47/06* | (2012.01) |
| *E21B 43/26* | (2006.01) |
| *E21B 33/068* | (2006.01) |
| *E21B 34/00* | (2006.01) |
| *F16K 3/02* | (2006.01) |
| *F16K 17/16* | (2006.01) |

(52) U.S. Cl.
CPC ............. *E21B 47/06* (2013.01); *F16K 3/02* (2013.01); *F16K 17/16* (2013.01); *G05D 7/0623* (2013.01); *G05D 7/0629* (2013.01); *G05D 7/0635* (2013.01)

(58) Field of Classification Search
CPC ......... Y10T 137/7762; Y10T 137/0318; Y10T 137/7761; Y10T 137/1714; F16K 3/02; F16K 3/0254; F16K 17/16; F16K 31/1262; F16K 37/0091; E21B 34/02; E21B 34/00; E21B 34/16; E21B 34/10; E21B 34/06; E21B 33/068; E21B 43/26; E21B 47/06; E21B 41/00; F15B 2211/7052; F15B 2211/6303; F15B 2211/31576; F15B 2211/665; F15B 20/00

See application file for complete search history.

(56) References Cited

U.S. PATENT DOCUMENTS

| | | | |
|---|---|---|---|
| 4,213,480 A * | 7/1980 | Orum | F16K 31/143 137/556 |
| 4,570,673 A | 2/1986 | Kendrick et al. | |
| 2009/0256099 A1 | 10/2009 | Palmer | |
| 2011/0114389 A1 * | 5/2011 | Mathena | F23G 7/085 175/66 |
| 2012/0227983 A1 * | 9/2012 | Lymberopoulos | E21B 34/02 166/373 |
| 2012/0248108 A1 | 10/2012 | Goodyear et al. | |
| 2013/0126152 A1 | 5/2013 | Banks et al. | |
| 2013/0175038 A1 | 7/2013 | Conrad | |
| 2015/0144336 A1 * | 5/2015 | Hardin | E21B 44/00 166/250.01 |

OTHER PUBLICATIONS

"Pressure Pumping Safety Plugs," Oseco Oilfield Products, p. 1 (Jul. 17, 2018).

Kajaria, S., et al., Line manifold for concurrent fracture operations, GE co-pending U.S. Appl. No. 61/805,296, filed Mar. 26, 2013.

McEvoy, T.K., et al., Frac relief valve, GE co-pending U.S. Appl. No. 62/092,583, filed Dec. 16, 2014.

* cited by examiner

SAFETY SYSTEMS FOR ISOLATING OVERPRESSURE DURING PRESSURIZED FLUID OPERATIONS

CROSS REFERENCE TO RELATED APPLICATION

This application claims priority to and the benefit of: U.S. Provisional Application Ser. No. 61/978,611 filed Apr. 11, 2014, titled "Safety Systems For Isolating Over Pressure During Pressurized Fluid Operations;" and U.S. Provisional Application Ser. No. 62/092,583 filed Dec. 16, 2014, titled "Frac Relief Valve," the full disclosure of each which is hereby incorporated herein by reference in its entirety for all purposes.

BACKGROUND

1. Field of Disclosure

This invention relates in general to systems for controlling the distribution of fluid to one or more wellbores, and in particular to pressure relief systems for manifolds associated with hydrocarbon production systems.

2. Description of Related Art

Certain hydrocarbon production related activities, such as well stimulation and hydraulic fracturing, require the pumping of pressurized fluid down hole. During hydraulic fracturing, as an example, a fluid is pumped into a subterranean geologic formation through the wellbore. The fluid is provided at a sufficient pressure to fracture the geologic formation, thus facilitating the recovery of hydrocarbons from the formation. Fluid is pressurized by one or more pumps, which is then pumped down high pressure flow lines to the well bore.

During the hydraulic fracturing process, the pumps operate at a predetermined pressure, and push the fluid down hole. Pressure spikes are a common phenomenon in hydraulic fracturing. For example, during a screen out, the solids carried in a treatment fluid, such as proppant in a fracture fluid, create a bridge across a restricted flow area. The bridge partially or fully blocks the flow of treatment fluid and creates a sudden and significant restriction to fluid flow that causes a rapid rise in pump pressure. In other cases pressure spikes can be attributed to machine faults or human errors such as improper setting of the pumps.

If the pressure spike is not sensed, then the components of the fluid flow system are exposed to a significant pressure, and equipment that is rated below the pressure spike can be damaged. The components of the distribution manifold and other pressure equipment is designed to operate at a rated design pressure with industry standard safety factors. When fluid pressure exceeds the design pressure, equipment associated with the fluid distribution system at the distribution manifold, down hole, or otherwise, can become damaged. In addition, when the design pressure is exceeded, a destructive blowout can occur. This blowout can result in the ejection of components or high pressure fluids, leakage of fluids to the environment, or both.

In some current hydraulic fracturing systems, operational personnel observe pressure readings at a surface location and make a decision on when to shut down the hydraulic fracturing system. In other current hydraulic fracturing systems, the pumping truck will have a pressure relief system. However the pressures at the truck can be so high that if such a relief system is utilized to relieve pressure, the magnitude of the pressure spike could have already damaged the hydraulic fracturing system equipment, or other associated system components.

SUMMARY OF THE DISCLOSURE

Embodiments of the current disclosure can protect expensive components by relieving pressure when a pressure spike, such as that caused by a screen out or a clogging problem occurs. Systems and methods disclosed herein can have an engineered point of failure that is predictable and that is economical to replace. Embodiments of this disclosure automate the pressure control and relief procedure, providing a more safe and reliable system for discrete or continuously variable relief of pressure. Systems and methods described in this disclosure provide a relief passage for excess pressure to drain to a containment tank, and alert the operator that the design pressure has been exceeded so that the operator can shut down the pump or regulate the pressure, as required. As described herein, systems and methods of this disclosure therefore provide a safety system to reduce equipment damage and blowouts, which can cause injury and environmental spills. Embodiments of this disclosure also provide systems and methods of resuming operations after an overpressure event that does not require shutting down the hydrocarbon development activity or deconstruction of the overpressure safety system.

In an embodiment of this disclosure, an overpressure safety system for use with a distribution of pressurized fluid associated with a hydrocarbon production operation is disclosed. The safety system includes a fluid control manifold assembly having a main bore in fluid communication with a fluid inlet. The fluid control manifold assembly further includes at least one distribution leg associated with a subterranean well. The distribution leg has a pressure barrier located between the main bore and the subterranean well. The pressure barrier is moveable between an open position where pressurized fluid can travel from the fluid inlet, through the main bore and to the subterranean well, and a closed position where pressurized fluid is prevented from passing through the distribution leg to the subterranean well. A safety valve is in fluid communication with the main bore of the fluid control manifold assembly. The safety valve has a blocking condition and a venting condition, wherein in the blocking condition the safety valve blocks a flow of the pressurized fluid through the safety valve, and in the venting condition the safety valve provides a fluid flow path for the pressurized fluid at a set overpressure to vent through the safety valve. A valve member is moveable within the safety valve between a first position and a second position, wherein in the first position a pressure side of the valve member blocks the flow of the pressurized fluid at a pressure below the set overpressure from passing through the safety valve, and in the second position, the valve member provides a fluid flow path for the pressurized fluid at any pressure to pass through the safety valve. An overpressure line is located on a side of the valve member opposite the pressure side of the valve member. A discharge container in fluid communication with the overpressure line.

In an alternate embodiment of the current disclosure, an overpressure safety system for use with a distribution of pressurized fluid associated with a hydrocarbon production operation includes a fluid control manifold assembly having a main bore in fluid communication with a fluid inlet. The fluid control manifold assembly further includes at least one distribution leg associated with a subterranean well, the distribution leg having a pressure barrier located between the main bore and the subterranean well. The pressure barrier is moveable between an open position where pressurized fluid can travel from the fluid inlet, through the main bore and to the subterranean well, and a closed position where pressurized fluid is prevented from passing through the distribution leg to the subterranean well. A safety valve is in fluid communication with the main bore of the fluid control manifold assembly. The safety valve has a gate with a blocking condition and a venting condition, wherein in the blocking condition, the gate has a pressure side that blocks a flow of the pressurized fluid through the safety valve and in the venting condition, the gate provides a fluid flow path through the safety valve for the pressurized fluid at a set overpressure to vent through the safety valve. An overpressure line is located on a side of the valve member opposite the pressure side of the valve member. The gate is moveable within the safety valve between a first position where a solid surface registers with the overpressure line and a second position where an opening through the gate registers with the overpressure line.

In yet another alternate embodiment of the current disclosure, a method for relieving an overpressure of a pressurized fluid of a fluid control manifold assembly associated with a hydrocarbon production operation is disclosed. The fluid control manifold assembly has a main bore in fluid communication with a fluid inlet and at least one distribution leg associated with a subterranean well. The distribution leg has a pressure barrier located between the main bore and the subterranean well, wherein the pressure barrier is moveable between an open position where pressurized fluid can travel from the fluid inlet, through the main bore and to the subterranean well, and a closed position where pressurized fluid is prevented from passing through the distribution leg to the subterranean well. The method includes providing a safety valve in fluid communication with the main bore of the fluid control manifold. The safety valve has a valve member that is moveable within the safety valve between a first position and a second position. In the first position a pressure side of the valve member blocks the flow of the pressurized fluid at a pressure below the set overpressure from passing through the safety valve, and in the second position, the valve member provides a fluid flow path for the pressurized fluid at any pressure to pass through the safety valve. The valve member is maintained in a blocking condition where the safety valve blocks a flow of the pressurized fluid through the safety valve, until the pressurized fluid is at a pressure of at least a set overpressure and the valve member reaches a venting condition where the safety valve provides a fluid flow path for the pressurized fluid at a set overpressure to vent through the safety valve. An overpressure line is provided that is located on a side of the valve member opposite the pressure side of the valve member so that pressurized fluid flowing through the safety valve can travel through the overpressure line to a discharge container.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

Figure 1:
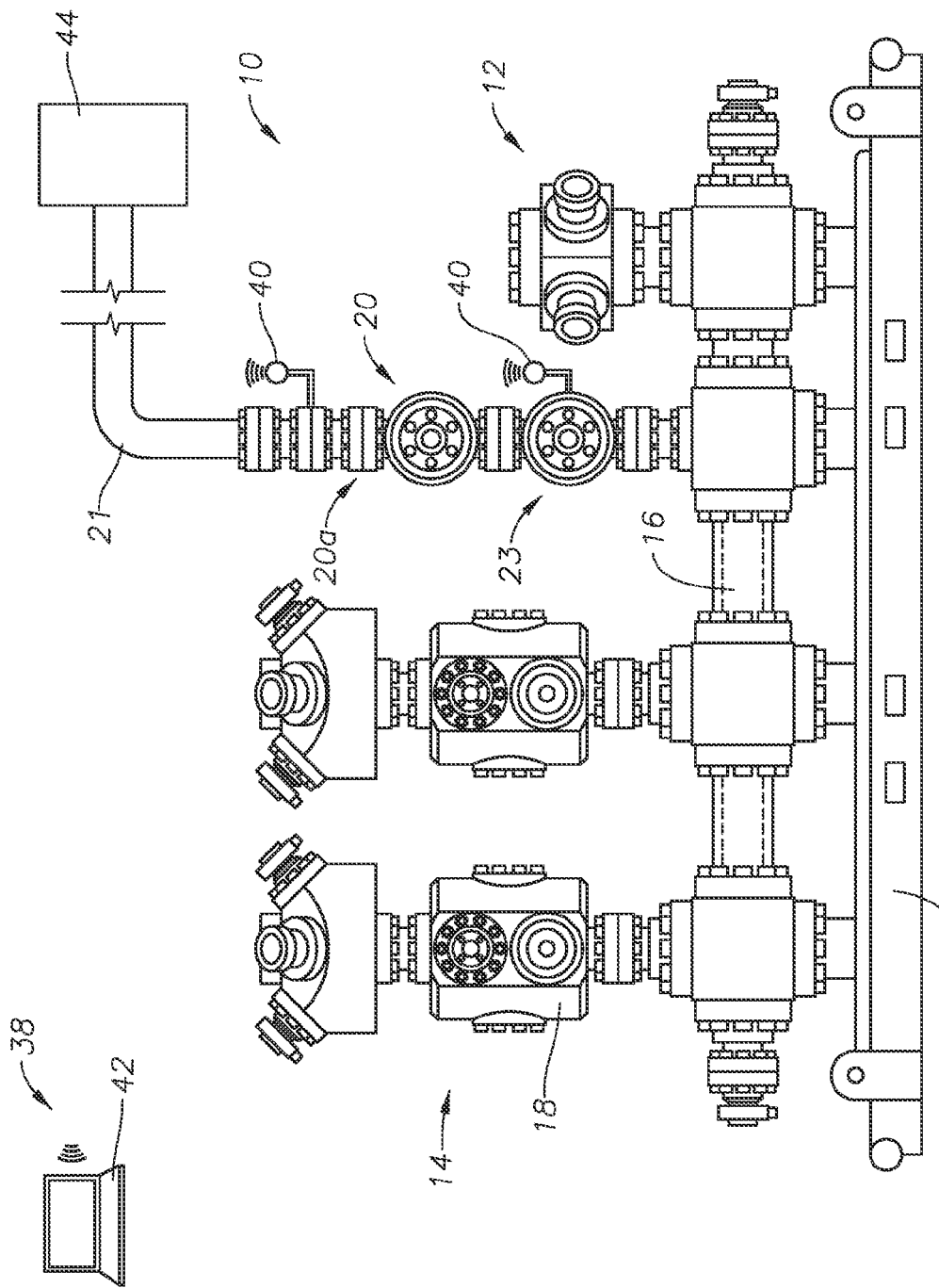
FIG. 1 is an elevation view of an example of a fluid control manifold assembly with an overpressure safety system in accordance with an embodiment of this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Looking at FIG. 1, an example of an overpressure safety system includes fluid control manifold assembly 10 having fluid inlet 12. The function of the fluid control manifold assembly 10 is to direct the flow of fluid to one well at a time, and isolate the other wells from the fluid during hydrocarbon production operations. Fluids for injection into a subterranean well can be delivered to the fluid control manifold assembly 10 through fluid inlet 12. Fluid inlet 12 can, for example, be connected with high pressure fluid flow lines to a pumping truck that pumps high pressure fluids, such as hydraulic fracturing fluids, to fluid control manifold assembly 10 for injection into an underground formation of the well. Manifold skid 13 can support fluid control manifold assembly 10, as well as the other components of the overpressure safety system.

The example fluid control manifold assembly 10 of FIG. 1 includes two vertically oriented distributions legs 14. Each distribution leg 14 is associated with a well. High pressure fluid flow lines can extend between each distribution leg 14 and a well for delivering high pressure fluids from fluid control manifold assembly 10 to the well associated with such distribution leg 14. Main bore 16 is in fluid communication with fluid inlet 12 and can extend between fluid inlet 12 and each distribution leg 14 so that fluid pumped into fluid inlet 12 can reach each distribution leg 14. Although the example of FIG. 1 shows two distribution legs 14, alternate examples can include one distribution leg 14 or can include more than two distribution legs 14.

Each distribution leg 14 can include a pressure barrier 18. Pressure barrier 18 can be, for example, a valve assembly. Pressure barrier 18 can be used to isolate wells from the fluid that is pumped into fluid control manifold assembly 10. Pressure barrier 18 is located along the path of the fluid flow between main bore 16 and the subterranean well. Pressure barrier 18 is moveable between an open position where pressurized fluid can travel from fluid inlet 12, through main bore 16 and to the subterranean well, and a closed position where pressurized fluid is prevented from passing through distribution leg 14 to the subterranean well. Each distribution leg 14 can have one or more than one pressure barrier 18.

Each distribution leg 14 can be connected in parallel to fluid inlet 12 so that fluid pumped into inlet 12 can be delivered to any distribution leg 14, regardless if any pressure barrier 18 of another distribution leg 14 is an open or closed position. If pressure barrier 18 of one of the distribution legs 14 is in the closed position, the high pressure fluids will be prevented from passing through such distribution leg 14, but will not be prevented from reaching any other of the distribution legs 14.

Figure 2:
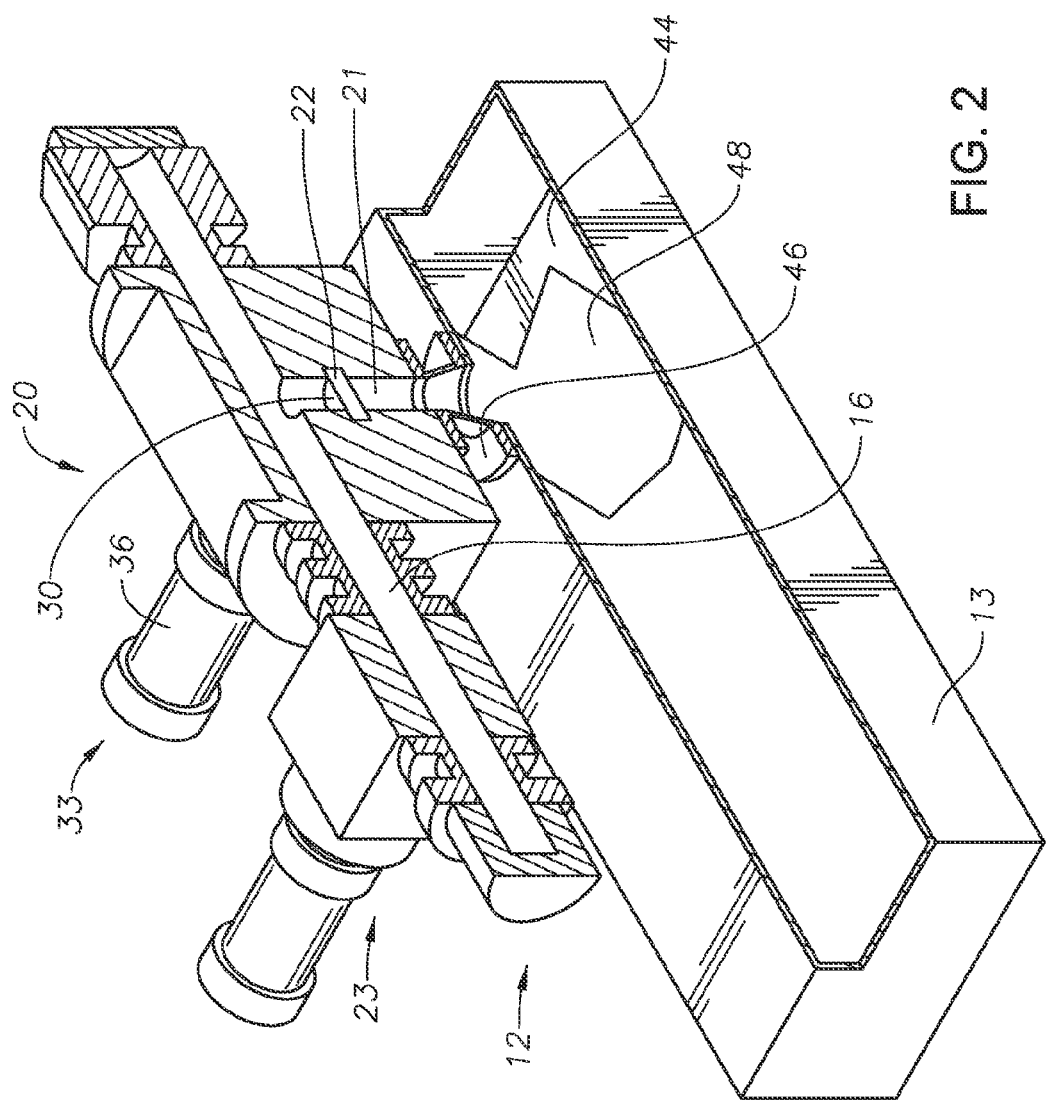
FIG. 2 is a perspective partial section view of a portion of a fluid control manifold assembly with a safety valve in accordance with an embodiment of this disclosure.

Looking at FIGS. 1-2, fluid control manifold assembly 10 also includes safety valve 20. Safety valve 20 is in fluid communication with main bore 16 of fluid control manifold assembly 10. Safety valve 20 can be connected in parallel with each distribution leg 14 so that fluid pumped into inlet 12 can reach safety valve 20, regardless of whether pressure barriers 18 are in open or closed positions. In alternate embodiments, each distribution leg 14 could include a safety valve 20.

Fluid control manifold assembly 10 can also include one or more backup safety valves 20a that are also in fluid communication with main bore 16 of the fluid control manifold assembly. Backup safety valve 20a can be located in series with safety valve 20 relative to main bore 16. Backup safety valve 20a can be selected to provide a fluid flow path for a pressurized fluid that is at a pressure greater than a set overpressure to pass through backup safety valve 20a. Backup safety valve 20a can alternately be located in parallel with safety valve 20, relative to main bore 16. Although only one backup safety valve 20a is shown, other embodiments can include multiple backup safety valves 20a. Backup safety valve 20a can be a safety valve in accordance with an embodiment of this disclosure, or can be another style of safety valve or pressure relief device known in the art.

Fluid control manifold assembly 10 can further include shutoff valve 23. Shutoff valve 23 can prevent pressurized fluids from traveling from inlet 12 to safety valve 20. Shutoff valve 23 can block the flow of fluids through main bore 16 (FIG. 2), or can block the flow of fluids through the flow line that travels from main bore 16 to safety valve 20 (FIG. 1). Shutoff valve 23 can operate to open or close when pressure of pressurized fluids exceeds a preset limit, or can be operated by an operator to open or close when otherwise desired.

Safety valve 20 can have a blocking condition (FIG. 8) and a venting condition. In the blocking condition safety valve 20 blocks a flow of the pressurized fluid through safety valve 20, and in the venting condition safety valve 20 provides a fluid flow path for a pressurized fluid that is at a set overpressure to pass through safety valve 20. As will be explained in further detail below, safety valve 20 can change between the blocking condition and the venting condition, for example, by moving valve member 22 within safety valve 20, so that an opening 24 through valve member 22 provides a fluid flow path for a pressurized fluid that is at a set overpressure to pass through safety valve 20. Alternately, safety valve 20 can be in a venting condition when a burst disk 26 located within burst disk opening 28 has ruptured so that a pressurized fluid that is at a set overpressure can pass through safety valve 20.

Figure 6:
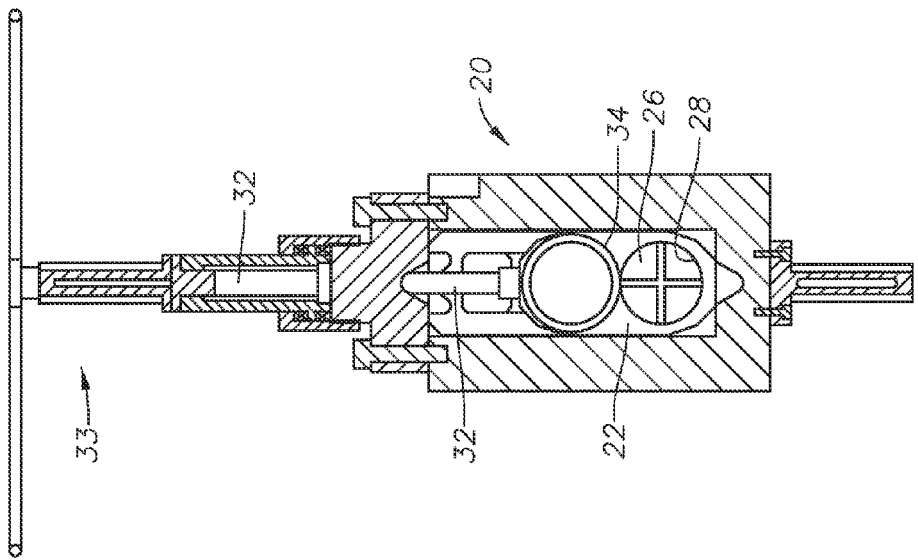
FIG. 6 is a section view of the safety valve of FIG. 3 shown in the first position and a blocking condition.
Figure 7:
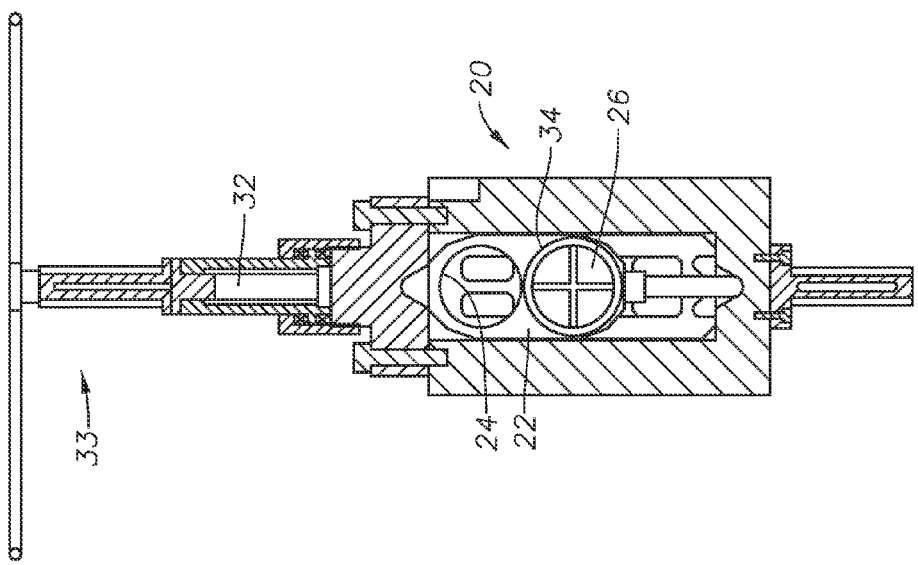
FIG. 7 is a section view of the safety valve of FIG. 3 shown in the second position.

Valve member 22 is moveable within safety valve 20 between a first position (FIGS. 6 and 8) and a second position (FIG. 7). In the first position, in the example of FIGS. 6 and 8, pressure side 30 of valve member 22 blocks the flow of the pressurized fluid at a pressure below the set overpressure from passing through safety valve 20 and into overpressure line 21. Overpressure line 21 is located on a side of valve member 22 opposite pressure side 30 of valve member 22. In the example embodiment of FIG. 8, in the first position valve member 22 can also block the flow of the pressurized fluid that reaches a pressure above the set overpressure from passing through safety valve 20. In the example of FIG. 6, burst disk 26 will block the flow of the pressurized fluid from passing through safety valve 20 until the pressure of the pressurized fluids reaches a pressure at or above the set overpressure.

Figure 3:
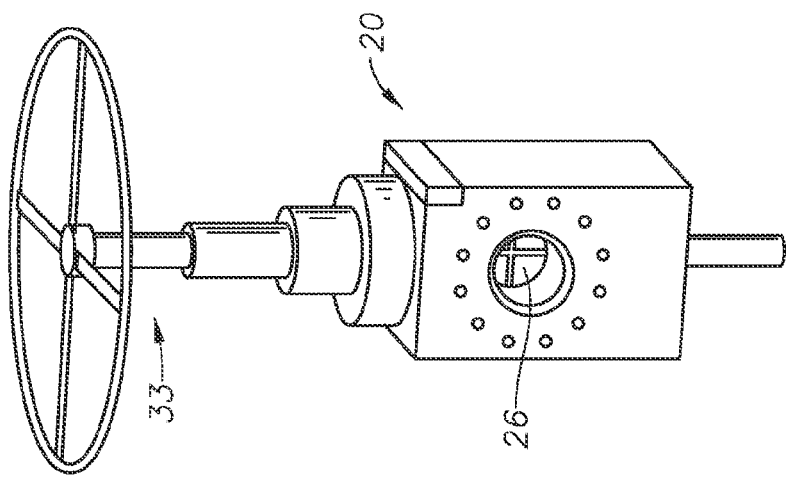
FIG. 3 is a perspective view of a safety valve with a modified gate in accordance with an embodiment of this disclosure, shown in the first position and a blocking condition.

In the second position, valve member 22 provides a fluid flow path through opening 24 for the pressurized fluid at any pressure to pass through the safety valve. In the example embodiments of FIGS. 3 and 8, safety valve 20 is a gate valve and valve member 22 is a gate. In alternate embodiments, safety valve 20 can be another type of valve known in the industry.

Figure 8:
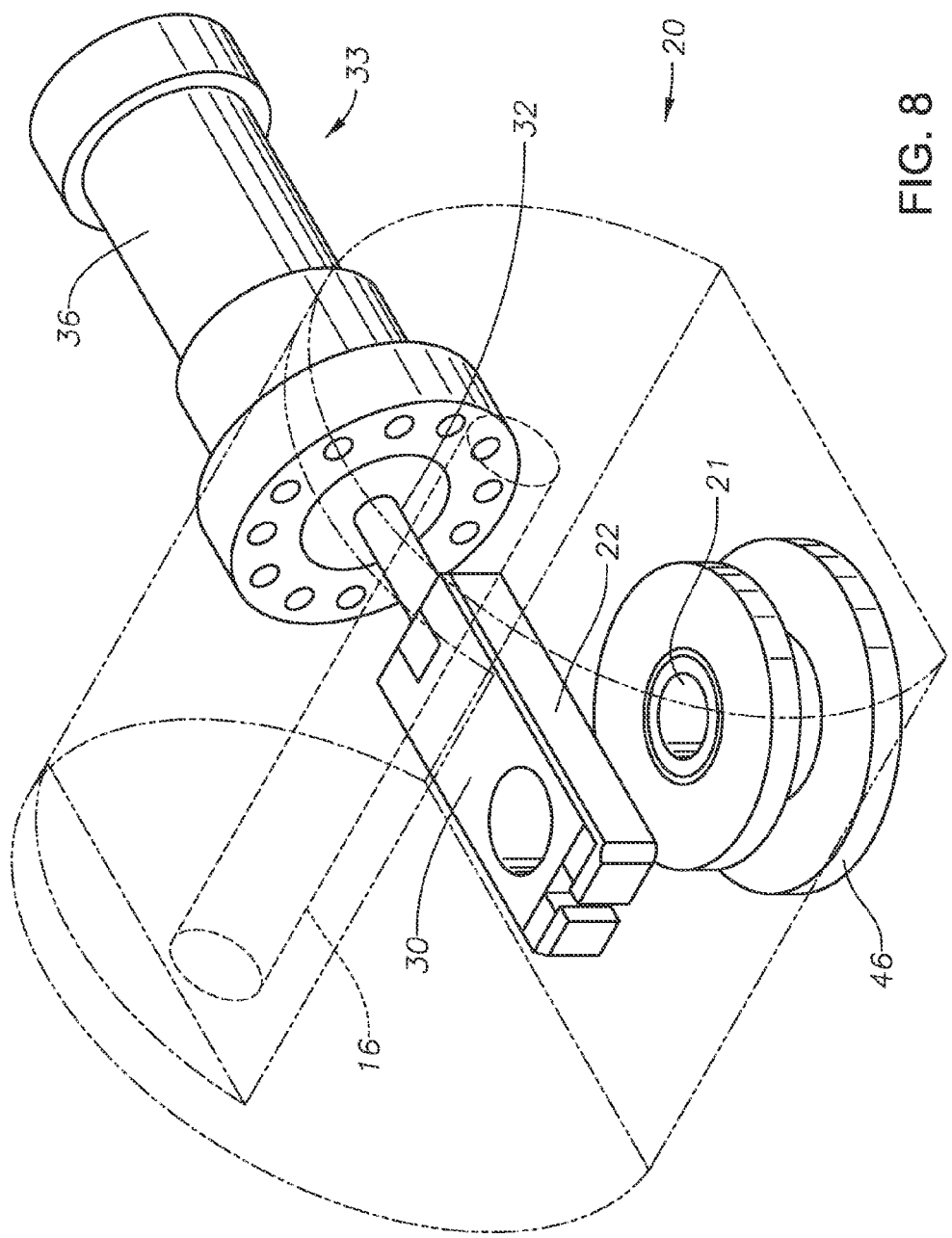
FIG. 8 is a perspective view of the safety valve of FIG. 2, shown in the first position and a blocking condition.

Looking at the examples of FIGS. 6 and 8, safety valve 20 includes valve member 22, which is a gate. Valve member 22 is generally rectangular in shape and has an upstream gate face such as pressure side 30 and downstream gate face opposite of pressure side 30. Pressure side 30 faces in the direction of main bore 16. In the example of FIG. 1, safety valve 20 is located above main bore 16 and so pressure side 30 (not shown in FIG. 1) would face downwards and in the example of FIG. 2, safety valve 20 is located below main bore 16 and so pressure side 30 faces upwards.

Valve member 22 can be moved within safety valve 20 between the first position and the second position by stem 32. Stem 32 can be moved linearly or by rotation by actuator assembly 33 to move valve member 22 between the first and second positions. Actuator assembly 33 can include, for example, a hand wheel (FIG. 3) or a fast acting actuator 36 (FIG. 8). Seat rings 34 can be located between each gate face and the body of valve member 22. Sealing surfaces between the seat ring faces and the gate faces can form a seal around opening 24 and burst disk opening 28, in turn, as applicable, when valve member 22 is in the first position or the second position.

Looking at FIGS. 3-7, valve member 22 includes both opening 24 and burst disk opening 28. In the embodiments shown in FIGS. 6-7, valve member 22 can be moved so that opening 24 registers with overpressure line 21 and safety valve 20 is in a second position (FIG. 7) where valve member 22 provides a fluid flow path for the pressurized fluid at any pressure to pass through safety valve 20. Valve member 22 can also be moved so that burst disk opening 28 instead registers with overpressure line 21 and safety valve 20 is in a first position (FIG. 6). In alternate embodiments, both opening 24 and burst disk opening 28 can contain burst disks 26. In other alternate embodiments, burst disk opening 28 can contain a burst disk 26 and opening 24 can be replaced with a solid portion of valve member 22 so that only one opening exists through valve member 22. In yet other alternate embodiments, a burst disk 26 can be located in opening 24 and burst disk opening 28 can be replaced with a solid portion of valve member 22 so that only one opening exists through valve member 22.

Figure 5:
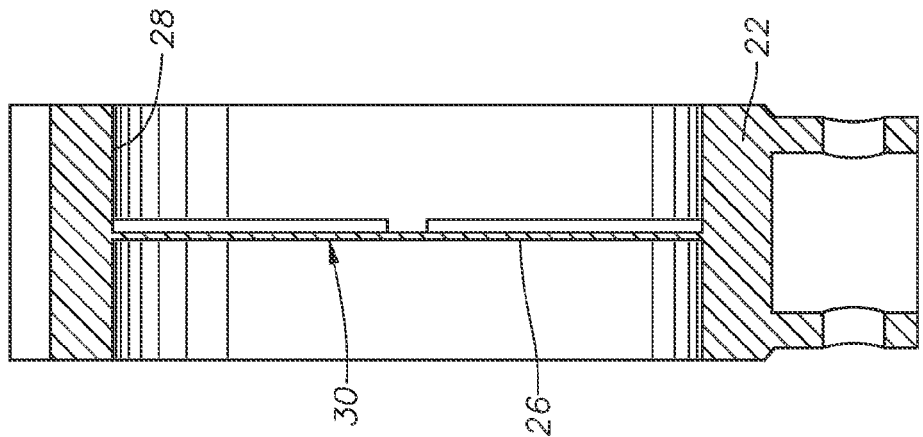
FIG. 5 is a section view of a portion of the gate of FIG. 4.
Figure 4:
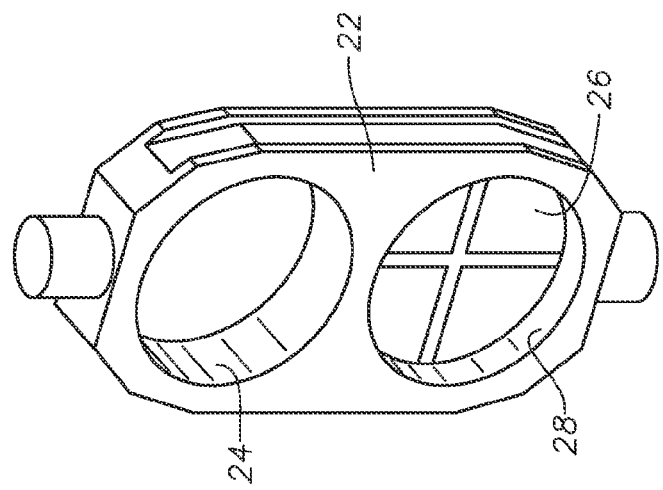
FIG. 4 is a perspective view of the gate of the safety valve of FIG. 3.

In the example of FIGS. 5-6, burst disk 26 covers burst disk opening 28 so that pressure side 30 of burst disk 26 of valve member 22 blocks the flow of the pressurized fluid at a pressure below the set overpressure from passing through safety valve 20. When safety valve 20 is in the blocking condition and valve member 22 is in the first position (FIG. 6), burst disk 26 can continue to block the flow of the pressurized fluid at a pressure below the set overpressure from passing through safety valve 20. Burst disk 26 can be selected to rupture when the pressurized fluid reaches the set overpressure. When burst disk 26 ruptures, safety valve 20 will then be in a venting condition and burst disk opening 28 will provide the fluid flow path for the pressurized fluid to pass through safety valve 20, without moving valve member 22 to the second position of FIG. 7.

Burst disk 26 can be a single use member and acts as a barrier to the pressure of the pressurized fluid. Burst disk 26 can be insertable into burst disk hole 28, and can be welded in place, press fit, or threaded. Alternately, burst disk 26 can be integrally formed with valve member 22. Burst disk 26 can act as a removable safety plug that is set to a specified burst pressure. If the specified burst pressure is exceeded, burst disk 26 will rupture. In certain embodiments, more than one burst disk 26 can be located within burst disk hole 28 and each burst disk 26 can have a different specified burst pressure.

In an embodiment with more than one safety valve 20, or with a single safety valve 20 and one or more backup safety valves 20a that contain a bust disk 26, each of the burst disks 26 can be set to a different specified burst pressure. For example, the first burst disk 26 that is exposed to the pressure of pressurized fluid can be set at a lower specified burst pressure than the burst disks that are downstream of such first burst disk 26. If the first burst disk 26 is subjected to pressure above its burst pressure and ruptures, the pressurized fluid would pass through safety valve 20 that contains first burst disk 26 and would act on the next burst disk 26. If the pressure of the pressurized fluid is below the burst pressure of the next burst disk 26, the next burst disk 26 could remain intact, providing the operator time to modify the pressure of the system without having to shut down operations.

In alternate embodiments, valve member 22 has a secondary burst disk covering opening 24 that registers with overpressure line 21 when valve member 22 is in the second position. The secondary burst disk can be selected to block the pressurized fluid when the pressurized fluid is at the set overpressure, and to rupture when the pressurized fluid reaches a secondary set overpressure that is greater than the set overpressure. In such an embodiment, if burst disk 26 was to rupture, valve member 22 can be moved to the second position and the secondary burst disk could block the flow of the pressurized fluid from passing through safety valve 20, even if the pressure of the pressurized fluid is equal to or above the set overpressure. When the pressure of the pressurized fluid reaches the secondary set overpressure, the secondary burst disk will rupture and opening 24 will provide the fluid flow path for the pressurized fluid to pass through safety valve 20, with valve member 22 in the second position.

Figure 10:
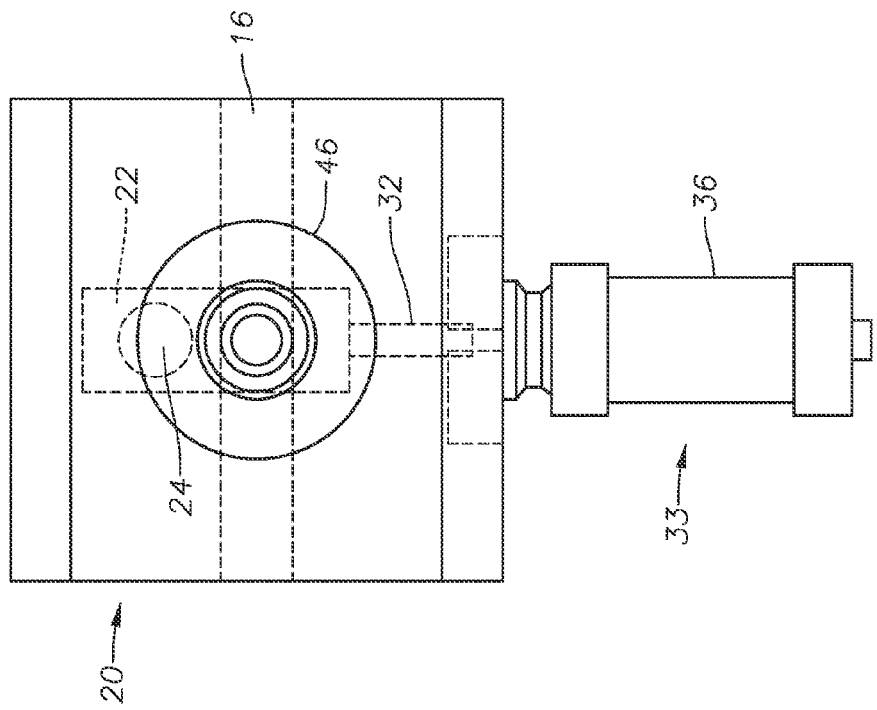
FIG. 10 is a bottom view of the safety valve of FIG. 8.
Figure 9:
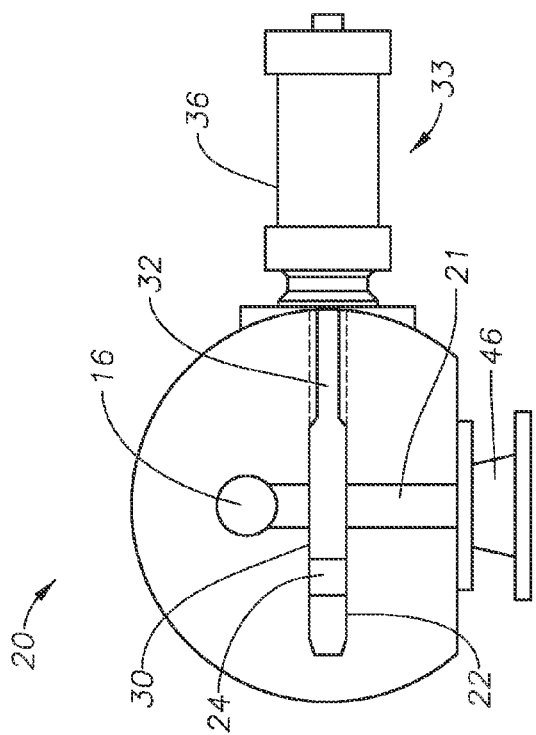
FIG. 9 is an elevation section view of the safety valve of FIG. 8.

Turning to FIGS. 8-10, in an alternate embodiment, valve member 22, which is shown as a gate, includes opening 24, but not burst disk opening 28. When valve member 22 is in the first position, a solid surface area of valve member 22 will block overpressure line 21 and safety valve 20 is in a blocking condition. When safety valve 20 is in the venting condition, opening 24 will register with overpressure line 21 and where valve member 22 will provide a fluid flow path for the pressurized fluid at any pressure to pass through safety valve 20.

Safety valve 20 can be a normally open valve that is retained in the blocking condition during normal operating conditions and is returned to the venting condition when the pressurized fluid reaches the set overpressure. Fast acting actuator 36 can be mechanically connected to safety valve 20 to move safety valve 20 from the blocking condition to the venting condition when the pressurized fluid reaches the set overpressure. Fast acting actuator 36 can have, for example, a high powered spring system that can assist in quickly moving the safety valve from the blocking condition to the venting condition.

Looking at FIG. 1, fluid control manifold assembly 10 can include a feedback and control system 38 having a pressure sensor assembly 40 and an alarm that is triggered when an alarm pressure is measured by pressure sensor assembly 40. As an example, pressure sensor assembly 40 can have a pressure transmitter that transmits a measured pressure to a processing unit 42. Pressure sensor assemblies 40 can also include a flow meter and a flow meter transmitter that can transmit fluid flow information to processing unit 42. Pressure sensor assemblies 40 can be located along the flow line that leads from main bore 16 to overpressure line 21, either before or after safety valve 20, or both before and after safety valve 20 (FIG. 1). Pressure sensor assemblies can also be spaced around fluid control manifold assembly 10 as well as being located at other various locations throughout the fluid flow paths of fluids associated with fluid control manifold assembly 10 that are outside of fluid control manifold assembly 10.

Processing unit 42 can be in communication with fast acting actuator 36 so that when processing unit 42 determines that the pressurized fluid reaches the set overpressure, processing unit 42 can signal the fast acting actuator 36 to move valve member 22 to the second position so that safety valve 20 is in a venting condition and the overpressure of the pressurized fluid can be relieved. Processing unit 42 can also be in communication with shutoff valve 23 and can direct shutoff valve 23 to close if the pressure of the pressurized fluid reaches a predetermined amount.

Looking at FIGS. 1 and 2, overpressure line 21 can be in fluid communication with discharge container 44. When the safety valve 20 is in the venting condition, pressurized fluid can flow through safety valve 20 so that pressurized fluids from main bore 16 can be directed to discharge container 44. The flow of pressurized fluids into discharge container 44 allows a pressure spike to be relieved while preventing fluids from dispersing to the environment. Discharge container 44 can be, for example, an inflatable containment tank, a rigid construction tank, or other fluid containment device. In the example of FIG. 2, discharge container 44 can be a part of the manifold skid 13, such as being located within a base of manifold skid 13, so that the overall size of fluid control manifold assembly 10 is not increased by the addition of the overpressure safety system. Fluid momentum diffuser 46 and fluid director 48 can each be in fluid communication with overpressure line 21 and located downstream of safety valve 20 on a side of valve member 22 opposite pressure side 30 of valve member 22. Fluid momentum diffuser 46 can include a region of increasing diameter from overpressure line 21 in the direction towards discharge container 44 in order to reduce the velocity and pressure of the pressurized fluids as they enter discharge container 44. Discharge container 44 can also include a sand box for assisting in the safe collection of the fluids.

In an example of operation, under standard operating conditions, fluid control manifold assembly 10 can have the pressure barrier 18 of one distribution leg 14 open, and the pressure barrier 18 of each of the other distribution legs 14 can be closed, allowing pressurized fluid to be diverted to the well of choice. Shutoff valve 23 can be open to allow pressurized fluid to reach safety valve 20.

Looking at FIGS. 1 and 6, if valve member 22 is in the second position, pressurized fluid will pass through safety valve 20 and be blocked by backup safety valve 20*a*. Actuator assembly 33 can be used to move valve member 22 of safety valve 20 to the first position so that safety valve 20 is in the blocking condition. In such an example, pressurized fluid entering fluid control manifold assembly 10 through inlet 12 can be blocked by burst disk 26 from reaching overpressure line 21. If the pressure of the pressurized fluids reaches a pressure at or above the set overpressure, burst disk 26 can rupture and allow pressurized fluid to continue towards backup safety valve 20*a*. The set overpressure is generally selected to be a certain preset amount greater than the rated safe operating pressure of the equipment mounted on, or in fluid communication with, fluid control manifold assembly 10.

If the burst pressure for both safety valve 20 and any backup safety valve 20*a* is exceeded, all of the burst disks 26 will rupture, which will trigger an output signal from the pressure sensor and flow meter of pressure sensor assembly 40. Pressurized fluid can pass though safety valve 20 and backup safety valve 20*a*, through overpressure line 21 and into discharge container 44. This will bleed pressure from the system, reducing the overall fluid pressure acting on the system components.

The pump operator can then shut down the pumps or reduce the pump pressure. Pressure sensor assemblies 40 will allow the operator to determine the pressure that was achieved at the rupture of safety valve 20 or backup safety valve 20*a*, as applicable. Once pressure is within control, shutoff valve 23 can be closed to cut off the flow of fluids to containment tank. In the case of a design failure or fatigue causing the burst disk 26 of backup safety valve 20*a* to burst while safety valve 20 was in a second position, without the set overpressure having been reached, valve member 22 of safety valve 20 can be closed and burst disk 26 of safety valve 20 will block the flow of pressurized fluids and the operations can continue or resume with safety valve 20 acting as the primary safety plug. In such an embodiment, hydrocarbon production operation can resume without any deconstruction of the overpressure safety system, such as the removal or replacement of elements of safety valve 20 or backups safety valve 20*a*, which could require a shut down of the hydrocarbon production operations. Burst disk 26 of backup safety valve 20*a*, which has ruptured, can later be replaced during standard down time. In alternate embodiments, burst disk 26 of safety valve 20 or backup safety valve 20*a* can be replaced without shutting down hydrocarbon production operations, with safety valve 20 or backup safety valve 20*a* still assembled with control manifold assembly 10. As an example, if burst disk hole 28 is sized so that burst disk 26 that is to be fit within burst disk hole 28 has a smaller outer diameter than the bore through safety valve 20 or backup safety valve 20*a*, as applicable, burst disk 26 can be replaced within burst disk hole 28 by installing a new burst disk 26 through such bore through safety valve 20 or backup safety valve 20*a*, as applicable.

In alternate embodiments where a secondary burst disk covers opening 24, after an overpressure event, valve member 22 can be moved so that opening 24 registers with overpressure line 21 and safety valve 20 is in a blocking condition so that pressure side 30 of the secondary burst disk blocks the flow of the pressurized fluid through the safety valve and the hydrocarbon production operation can resume. In such an embodiment, hydrocarbon production operation can also resume without any deconstruction of the overpressure safety system, such as the removal or replacement of elements of safety valve 20, which could require a shut down of the hydrocarbon production operations. Therefore such an embodiment provides a system that can vent pressure during an overpressure event and then continue with the hydrocarbon production operation, such as hydraulic fracturing, with safety valve 20 simply being reset to a blocking condition using the elements of safety valve 20 that are part of the safety valve 20 before the overpressure event.

Looking at FIGS. 2 and 9, in an alternate embodiment of operation, with valve member 22 of safety valve 20 in the first position so that safety valve 20 is in the blocking condition, pressurized fluid entering fluid control manifold assembly 10 through inlet 12 is blocked by valve member 22 from passing through safety valve 20. Data from pressure sensor assemblies 40 can be transmitted to processing unit 42 where it is correlated against user defined parameters including but not limited to, pressure relief setting (set overpressure), pressure spike rise time, pressure spike duration, past pressure spike history. Such user defined parameters not only allow for automated pressure relief in the event of an over pressure event where the pressurized fluid reaches the set overpressure, but also allow for additional user defined parameters to provide increased functionality. For example, by measuring pressure, rate of pressure increase can be calculated by processing unit 42. Experience with a particular site or fluid characteristics could indicate a potential overpressure problem or other issue with equipment or procedure, even before the set overpressure is reached. Therefore the user defined parameters can be used by the processing unit 42 or observed by an operator to initiate a shutdown of the pumps rather than allowing the set overpressure to be reached and the safety valve 20 to be actuated. Once the set overpressure, or other user defined parameter, is reached, fast acting actuator 36 can be signaled by the processing unit to move valve member 22 to the second position so that safety valve 20 is in a venting condition. After the overpressure event, valve member 22 can be returned to the first position so that safety valve 20 is in the blocking condition and hydrocarbon production operation can resume without any deconstruction of the overpressure safety system, such as the removal or replacement of elements of safety valve 20, which could require a shut down of the hydrocarbon production operations. Therefore such an embodiment also provides a system that can vent pressure during an overpressure event and then continue with the hydrocarbon production operation, such as hydraulic fracturing, with safety valve 20 simply being reset to a blocking condition using the elements of safety valve 20 that are part of the safety valve 20 before the overpressure event.

Looking at FIG. 1, when safety valve 20 is in a venting condition, a signal can be communicated by processing unit 42 to pumping trucks to shut down the pumping process and remove input pressure. Processing unit 42 can include a visual or audio alarm system to notify an operator when the pressure of the pressurized fluid reaches an alarm pressure, or when safety valve 20 is in a blocking condition. In alternate embodiments, pressure sensor assemblies 40 can be transmitted wirelessly to a control unit display, a handheld device such as a smart phone, or to another visual or audio system capable of receiving wireless signals. Once the issue is resolved and fracturing operations restart, processing unit 42 can be reset. Processing unit 42 can also include a modulating pressure system that maintains a pressure rating without shutting system down completely, when there are smaller pressure fluctuations that are a typical and non-harmful part of the fracturing process. Processing unit 42 can also include recording and broadcasting capabilities.

The state of safety valve 20 and data relating to the pressurized fluid can be verified with the output from the pressure and flow measurements transmitted by pressure sensor assemblies 40. The output from pressure sensor assemblies 40 can be wired or transmitted wirelessly to a display system of processing unit 42, which can be located in the operator's control unit or at any other desired or convenient location.

Although described for use with hydraulic fracturing operations, systems and methods of this disclosure can also apply to other operations in which pressurized fluids are pumped down hole, or operations by which a well bore and related equipment is otherwise subjected to excess fluid pressure. The systems of this disclosure can be skid mounted before the fluid enters the distribution manifold, can be mounted on the distribution manifold (as shown in FIG. 1), or can be directly connected to a wellbore.

Embodiments of this disclosure reduce replacement costs of expensive components and reduce potential hazards to fracturing operations and to the environment. Although described for use with hydraulic fracturing operations, systems and methods of this disclosure can also apply to other operations in which pressurized fluids are pumped down hole, or operations by which a well bore and related equipment is otherwise subjected to excess fluid pressure.

The terms "vertical", "horizontal", "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. An overpressure safety system for use with a distribution of pressurized fluid associated with a hydrocarbon production operation, the safety system comprising:

a fluid control manifold assembly having a main bore in fluid communication with a fluid inlet, the fluid control manifold assembly further having at least one distribution leg associated with a subterranean well, the distribution leg having an above ground pressure barrier located between the main bore and the subterranean well, wherein the pressure barrier is moveable between an open position where the pressurized fluid can travel from the fluid inlet, through the main bore and to the subterranean well, and a closed position where the pressurized fluid is prevented from passing through the distribution leg to the subterranean well;

a safety valve in fluid communication with the main bore of the fluid control manifold assembly, the safety valve having a blocking condition and a venting condition, wherein in the blocking condition the safety valve blocks a flow of the pressurized fluid through the safety valve, and in the venting condition the safety valve provides a fluid flow path for the pressurized fluid at a set overpressure to vent through the safety valve;

a valve member that is moveable within the safety valve between a first position and a second position, wherein in the first position a pressure side of the valve member blocks the flow of the pressurized fluid at a pressure below the set overpressure from passing through the safety valve, and in the second position, the valve member provides the fluid flow path for the pressurized fluid at any pressure to pass through the safety valve;

an overpressure line located on a side of the valve member opposite the pressure side of the valve member;

a discharge container in fluid communication with the overpressure line; and a manifold skid supporting the fluid control manifold assembly, wherein the discharge container is located within the manifold skid, the manifold skid forming at least two pressure containing barriers of the discharge container, wherein a top of the discharge container forms at least one of the pressure barriers and supports the fluid control manifold assembly.

2. The safety system of claim 1, wherein the valve member is a gate, the gate having a solid surface that blocks the overpressure line when the safety valve is in the blocking condition and the valve member is in the first position, and the gate having an opening through the gate that registers with the overpressure line when the safety valve is in the venting condition and the valve member is in the second position.

3. The safety system of claim 1, wherein the safety valve is a normally open valve that is retained in the blocking condition when the pressurized fluid is below the set overpressure and is returned to the venting condition when the pressurized fluid reaches the set overpressure.

4. The safety system of claim 3, further comprising an actuator mechanically connected to the safety valve, the actuator moving the safety valve to the venting condition when the pressurized fluid reaches the set overpressure.

5. The safety system of claim 1, further comprising a fluid momentum diffuser in fluid communication with the overpressure line and located downstream of the safety valve on a side of the valve member opposite the pressure side of the valve member.

6. The safety system of claim 1, further comprising a feedback and control system with a pressure sensor assembly and an alarm that is triggered when an alarm pressure is measured by the pressure sensor assembly.

7. The safety system of claim 6, wherein the feedback and control system further includes a processing unit, the processing unit in communication with an actuator that is mechanically connected to the safety valve, the actuator moving the safety valve to the venting condition when the processing unit determines that a user defined parameter has been met.

8. The safety system of claim 6, wherein the feedback and control system further includes a processing unit, the processing unit in communication with an actuator that is mechanically connected to the safety valve, the actuator moving the safety valve to the venting condition when the processing unit determines that the pressurized fluid reaches the set overpressure.

9. The safety system of claim 1, wherein after an overpressure event, the safety valve is moveable to the first position so that the pressure side of the valve member blocks the flow of the pressurized fluid from passing through the safety valve and the hydrocarbon production operation can resume.

10. A method for relieving an overpressure of a pressurized fluid of a fluid control manifold assembly associated with a hydrocarbon production operation, the fluid control manifold assembly having a main bore in fluid communication with a fluid inlet and at least one distribution leg associated with a subterranean well, the distribution leg having an above ground pressure barrier located between the main bore and the subterranean well, wherein the pressure barrier is moveable between an open position where the pressurized fluid can travel from the fluid inlet, through the main bore and to the subterranean well, and a closed position where the pressurized fluid is prevented from passing through the distribution leg to the subterranean well, the method comprising:

providing a safety valve in fluid communication with the main bore of the fluid control manifold assembly, the safety valve having a valve member that is moveable within the safety valve between a first position and a second position, wherein in the first position a pressure side of the valve member blocks a flow of the pressurized fluid at a pressure below a set overpressure from passing through the safety valve, and in the second position, the valve member provides a fluid flow path for the pressurized fluid at any pressure to pass through the safety valve;

maintaining the valve member in a blocking condition where the safety valve blocks a flow of the pressurized fluid through the safety valve, until the pressurized fluid is at a pressure of at least the set overpressure and the valve member reaches a venting condition where the safety valve provides a fluid flow path for the pressurized fluid at a set overpressure to vent through the safety valve;

providing an overpressure line located on a side of the valve member opposite the pressure side of the valve member so that pressurized fluid flowing through the safety valve can travel through the overpressure line to a discharge container; and positioning the fluid control manifold assembly on a manifold skid, the manifold skid forming at least two pressure containing barriers of the discharge container, and a top of the discharge container being a support surface of the manifold skid for receiving the fluid control manifold assembly.

11. The method according to claim 10, wherein the safety valve is a normally open valve, the method further comprising retaining the valve member in the first position when the pressurized fluid is below the set overpressure and moving the valve member to the second position when the pressurized fluid reaches the set overpressure.

12. The method according to claim 11, wherein the step of moving the valve member to the second position includes moving the valve member to the second position with an actuator mechanically connected to the safety valve.

13. The method according to claim 10, further comprising sensing and transmitting a pressure of the pressurized fluid with a feedback and control system, the feedback and control system having a pressure sensor assembly with a pressure transmitter.

14. The method according to claim 13, wherein the feedback and control system includes a processing unit in communication with an actuator that is mechanically connected to the safety valve, the method further comprising signaling the actuator to move the safety valve to the venting condition with the processing unit when a user defined parameter has been met.

15. The method according to claim 13, wherein the feedback and control system includes a processing unit in communication with an actuator that is mechanically connected to the safety valve, the method further comprising detecting when the pressurized fluid reaches the set overpressure and signaling the actuator to move the safety valve to the venting condition with the processing unit.

16. The method according to claim 10, further comprising after an overpressure event, moving the valve member with an actuator so that the safety valve is in the blocking condition and the pressure side of the valve member blocks a flow of the pressurized fluid, and resuming the hydrocarbon production operations.

* * * * *